(12) United States Patent
Dasari et al.

(10) Patent No.: US 11,761,419 B2
(45) Date of Patent: Sep. 19, 2023

(54) ROOT ASSEMBLY OF A WIND TURBINE BLADE FOR A WIND TURBINE, WIND TURBINE BLADE AND WIND TURBINE

(71) Applicant: Siemens Gamesa Renewable Energy A/S, Brande (DK)

(72) Inventors: Rajanikanth Reddy Dasari, Ikast (DK); Luis Mailly, Lafayette, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/784,214

(22) PCT Filed: Dec. 10, 2020

(86) PCT No.: PCT/EP2020/085454
§ 371 (c)(1),
(2) Date: Jun. 10, 2022

(87) PCT Pub. No.: WO2021/122275
PCT Pub. Date: Jun. 24, 2021

(65) Prior Publication Data
US 2023/0041043 A1 Feb. 9, 2023

(51) Int. Cl.
*F03D 1/06* (2006.01)
(52) U.S. Cl.
CPC ...... *F03D 1/0658* (2013.01); *F05B 2260/301* (2013.01)
(58) Field of Classification Search
CPC .......................... F03D 1/0658; F05B 2260/301
See application file for complete search history.

(56) References Cited

U.S. PATENT DOCUMENTS

| 6,663,314 | B2 | 12/2003 | Bequet |
| 7,517,194 | B2* | 4/2009 | Doorenspleet ........ F03D 1/0658 |
| | | | 416/239 |
| 9,777,704 | B2* | 10/2017 | Minadeo ................ F03D 80/70 |
| 10,077,757 | B2* | 9/2018 | Kannenberg .......... F03D 1/0658 |
| 2003/0205011 | A1 | 11/2003 | Bequet |
| 2007/0231146 | A1 | 10/2007 | Birkemeyer et al. |
| 2007/0253819 | A1 | 11/2007 | Doorenspleet et al. |

FOREIGN PATENT DOCUMENTS

| CN | 101063437 B | 11/2012 |
| CN | 209671147 U | 11/2019 |
| CN | 209704748 U | 11/2019 |
| DK | 178388 B1 | 4/2007 |
| EP | 1840372 A2 | 10/2007 |
| TW | M584371 U | 10/2019 |

OTHER PUBLICATIONS

International Search Report & Written Opinion for PCT/EP2020/085454 dated Apr. 14, 2021.

* cited by examiner

*Primary Examiner* — Justin D Seabe
(74) *Attorney, Agent, or Firm* — Schmeiser, Olsen & Watts LLP

(57) ABSTRACT

A root assembly of a wind turbine blade for a wind turbine is provided. Also provided is a wind turbine blade including the root assembly and a wind turbine including the wind turbine blade.

15 Claims, 12 Drawing Sheets

ROOT ASSEMBLY OF A WIND TURBINE BLADE FOR A WIND TURBINE, WIND TURBINE BLADE AND WIND TURBINE

CROSS-REFERENCE TO RELATED APPLICATIONS

This application claims priority to PCT Application No. PCT/EP2020/085454, having a filing date of Dec. 10, 2020, which claims priority to EP Application No. 19216698.1, having a filing date of Dec. 16, 2019, the entire contents both of which are hereby incorporated by reference.

FIELD OF TECHNOLOGY

The following relates to a root assembly of a wind turbine blade for a wind turbine, a wind turbine blade and a wind turbine.

BACKGROUND

Root assemblies comprise a root portion of a wind turbine blade connected to a bearing or a hub flange of the wind turbine. Generally, the bearing or hub flange is connected to the root portion by multiple bolts secured within bushings (see FIG. 2) or threaded inserts (see FIG. 4) fixedly arranged in the root portion. Here, the bushings or threaded inserts are arranged along a common circumference.

However, in particular in large wind turbines, the root assemblies must be able to resist very high loads. For this purpose, a large number of bolts and bushings or threaded inserts needs to be provided in the root assembly but the space for the bushings or threaded inserts on a common circumference of the root portion is limited. Therefore, it is known to provide the root assembly with a staggered configuration of the multiple bolts (see FIG. 5).

Figure 6:
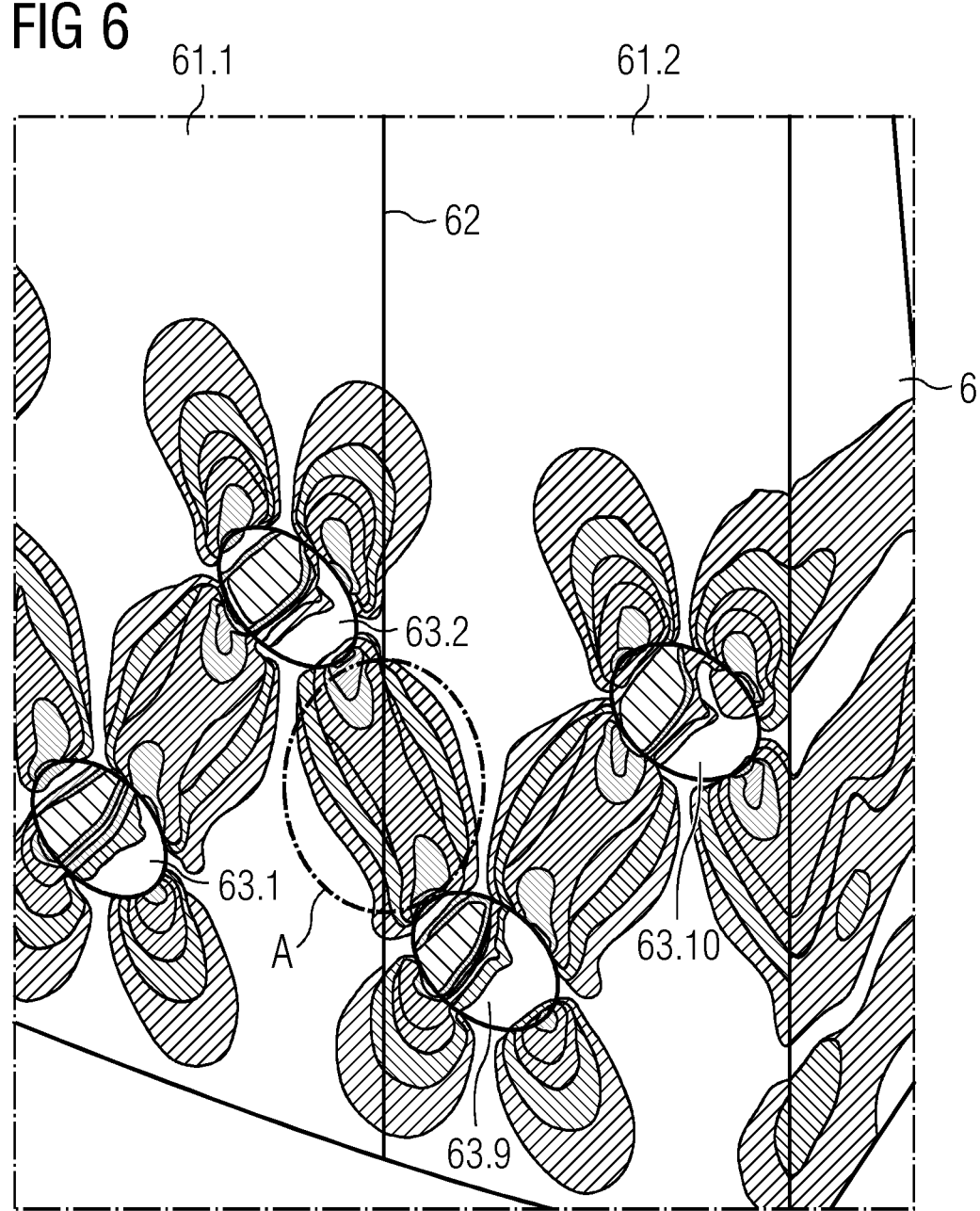

However, by shear strain analysis, the inventors have found, that the root portions with a staggered configuration of the bolts are susceptible to failure at a root segment interface between root segments of the root portion (see FIG. 6). This is because the root portion is not one monobloc portion but consists of different root segments connected together so as to form the root portion. For example, in a butterfly design of a wind turbine blade, the root portion typically consists of two root segments. In an integral design of a wind turbine blade, the root portion typically consists of multiple root segments joined together.

The configuration of such root assembly and the problem as well as the above reference figures and the further figures will later be explained with reference to the respective figures.

A root assembly according to the preamble of claim 1 and being susceptible to the above-described failure is known from DK178388B1.

SUMMARY

An aspect relates to an improved root assembly, wind turbine blade and wind turbine not having the previously described disadvantage, in particular having a long service life.

The object is solved by a root assembly of a wind turbine blade of a wind turbine, a wind turbine blade and a wind turbine. Thereby, the features and details described in connection with the root assembly of embodiments of the invention apply in connection with the wind turbine blade and with the wind turbine, so that regarding the disclosure of the individual aspects of embodiments of the invention it is or can be referred to one another.

According to a first aspect of embodiments of the invention, the object is solved by a root assembly of a wind turbine blade for a wind turbine, whereby (a) a root portion of the root assembly comprises at least two root segments being joined together at root segment interfaces formed between the at least two root segments, (b) a root attachment face of the root portion is attached to a bearing or a hub flange of the root assembly by multiple bolts, (c) each of the multiple bolts is connected to one of a multiple of bolted connection means fixedly arranged within the root segments such that the multiple bolts are arranged adjacent to each other along a circumference of the root portion and the bolted connection means are arranged adjacent to each other along the circumference of the root portion, and (d) adjacent bolted connection means are offset from one another in a way such that they are provided at different distances from the root attachment face, whereby in at least one of an interface pair of bolted connection means, wherein the bolted connection the at least one interface pair are provided within different root segments of the at least two root segments and are arranged closest to the root segment interface between the different root segments, the two bolted connection the at least one interface pair are provided at the same distance from the root attachment face.

Thereby, the shear strain at the root segment interface between the bolted connection the interface pair is removed or at least reduced and thus an improved root assembly having a long service life and in particular not having the previously described disadvantages is obtained.

In particular, the bolts may have threads on an outer circumference thereof. By these outer threads, they may be interlocked with inner threads of the bolted attachment means. In particular, the multiple bolts may be arranged in parallel to each other.

The root segments may in particular have a round shape, i.e., be rounded and moreover in particular have a partially circular or elliptical shape. In other words, the root segments may form an arc or have an arc shape. The root segments may have equal or different arc lengths among them. Thereby, a cylindrically shaped root portion of the wind turbine blade may be provided. The cross section of the root portion may have a circular or an elliptical shape.

The root segments may be reinforcement blocks (such as pre-cured laminate blocks) that are placed on or within a shell laminate of the wind turbine blade during manufacture of the shell, or they may simply be reinforced areas of the shell constructed by additional layers placed and cured together with the rest of the shell.

The root segments may be manufactured from a fiber composite material, in particular a fiber composite lay-up. The fiber composite material may have glass fibers and/or carbon fibers, for example.

That the two bolted connection the at least one interface pair are provided at the same distance from the root attachment face means that a line parallel to the root attachment face may be drawn from one of the bolted connection the interface pair to the other one of the bolted connection the interface pair. This means, that the most distant point of one of the bolted connection the interface pair from the root attachment face may be connected by that parallel line to a least distant point of the other bolted connection the interface pair from the root attachment face. Thereby, as long as the parallel line connects the two bolted connection means, the bolted connection means are at the same distance from the root attachment face according to embodiments of the invention.

In embodiments, the bolted connection means are bushings and/or threaded inserts. The bolts may be driven into the bushings and/or threaded inserts and thereby particularly easy connected with these.

In further embodiments, the multiple bolts are secured against the bearing or the hub flange by nuts. This is a particularly simple and easy way of securing the bearing or hub flange to the root portion.

In an embodiment, centers of the bolted connection the at least one interface pair are provided at the same distance from the root attachment face. Thereby, it can be very effectively prevented that the shear strains occur at the root segment interface.

In embodiments, a distance, in particular a shortest distance, between the bolts connected to the bolted connection the interface pair is greater than a distance, in particular a shortest distance, between adjacent bolts connected to bolted connection means within the at least two root segments. This avoids excessive concentration of longitudinal strains between the bolted connection means at same distance from the root attachment face, and provides additional space for placement of the root segment interface and associated manufacture tolerances.

In an embodiment, a circumferential distance, in particular a shortest circumferential distance, between the bolted connection the interface pair is greater than a circumferential distance, in particular a shortest circumferential distance, between bolted connection means within the at least two root segments. The circumferential distance is measured along the circumference of the root portion instead of measuring the direct distance between the bolted connection means. Thereby, the circumferential distance between the bolted connection means is independent from their distance from the root attachment face. That is, to measure the circumferential distance between two bolted connection means, imaginary lines are drawn from each of the two bolted connection to the root attachment face such that they are parallel to each other. The circumferential distance is measured along the circumference of the root portion and between the two imaginary lines being parallel to each other.

Also, in an embodiment the at least one interface pair comprises two bolted connection means within each of the different root segments, the two bolted connection means being arranged closest to the root segment interface between the different root segments, wherein the four bolted connection the at least one interface pair are provided at the same distance from the root attachment face. Thereby, it can be very effectively prevented that the shear strains occur at the root segment interface.

In embodiments, adjacent bolts are offset from one another within the respective root segments in that they are provided with different lengths within the root segments, whereby in at least one of an interface pair of bolts, wherein the bolts of the at least one interface pair are provided within different root segments of the at least two root segments and are arranged closest to the root segment interface between the different root segments, the two bolts of the at last one interface pair are provided with the same length.

In further embodiments, the multiple bolts have a first length or a second length, wherein the second length is greater than the first length, and wherein the bolts of the multiple bolts having the first length and the bolts of the multiple bolts having second length are alternately connected to the adjacent offset bolted connection means. By providing the multiple bolts in two lengths, the assembly of the root assembly is simplified and provided at little cost.

In an embodiment, the bolted connection the at least one interface pair are connected either with the bolts having the first length or with the bolts having the second length.

Further, in an embodiment, the bolted connection the at least one interface pair are connected with bolts having a third length, wherein the third length is different from the first length and the second length. Thereby, the assembly of the root assembly is further simplified, because the bolts to be used at the root segment interfaces can be easily distinguished by their length from the other bolts.

In an embodiment, the third length is in between the first length and the second length. Thereby, the shear strain distribution in the root portion may be further improved.

Further, at least one of the bolts may be provided with an extender. The extender is arranged on the bolt between the nut and the bearing or the hub flange. Thereby, the nut is secured against the extender instead of directly to the bearing or hub flange. Depending on the length of the extender used, the length of the bolt within the root segment may be adjusted. Thereby, all the multiple bolts may be provided having the same length to provide particularly cost-effective parts and still may be arranged in the staggered manner, for example.

According to a second aspect of embodiments of the invention, the object is solved by a wind turbine blade comprising the root assembly according to the first aspect of embodiments of the invention.

According to a third aspect of embodiments of the invention, the object is solved by a wind turbine comprising at least one wind turbine blade according to the second aspect of embodiments of the invention.

The wind turbine may be a direct drive wind turbine or a geared wind turbine, for example. Further, the at least one wind turbine blade may be mounted on an outer ring of a pitch bearing of the wind turbine or on an inner ring of the pitch bearing.

Further advantages, features and details of embodiments of the invention unfold from the following description, in which by reference to drawings FIGS. 1 to 13 embodiments of the present invention are described in detail. Thereby, the features from the claims as well as the features mentioned in the description can be essential for embodiments of the invention as taken alone or in an arbitrary combination. In the drawings, there is schematically shown:

BRIEF DESCRIPTION

Figure 1:
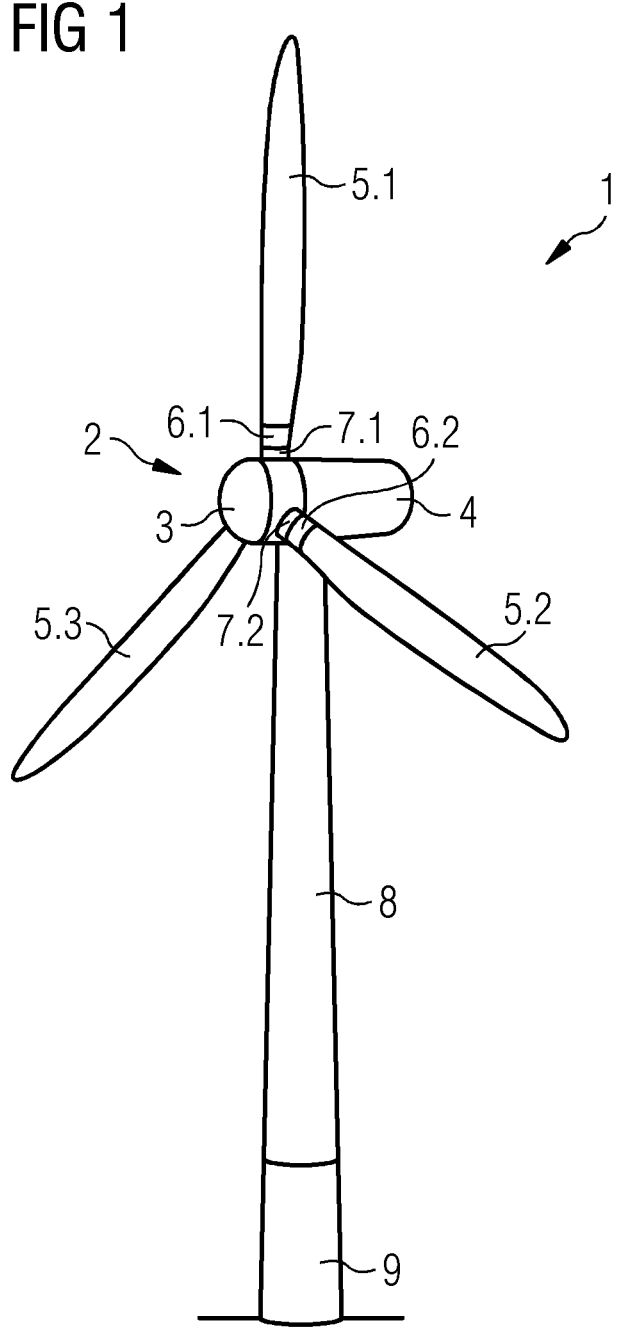
Figure 2:
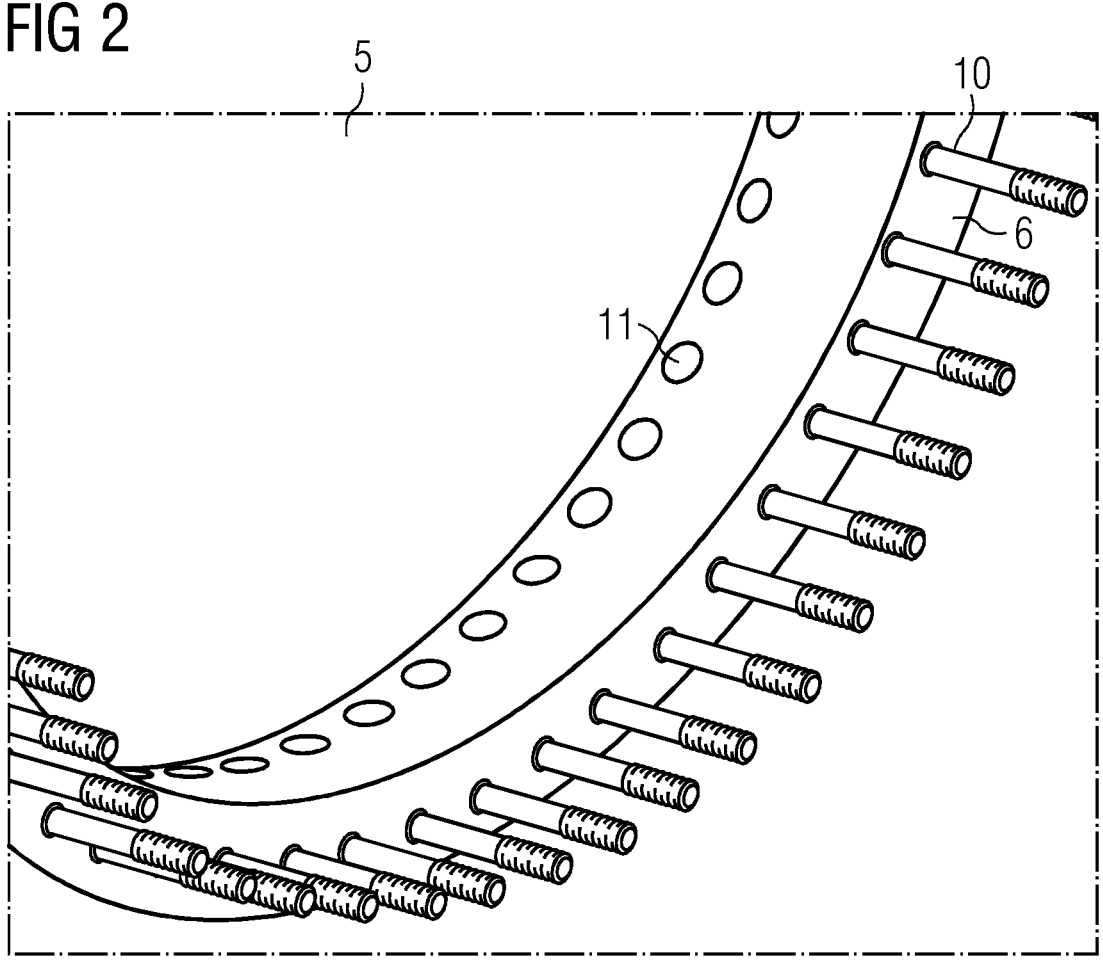
Figure 3:
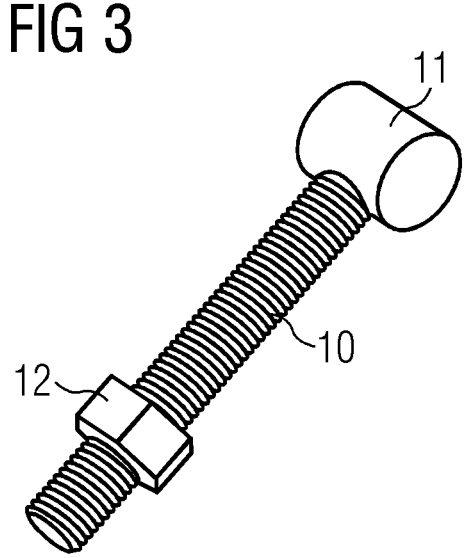
Figure 4:
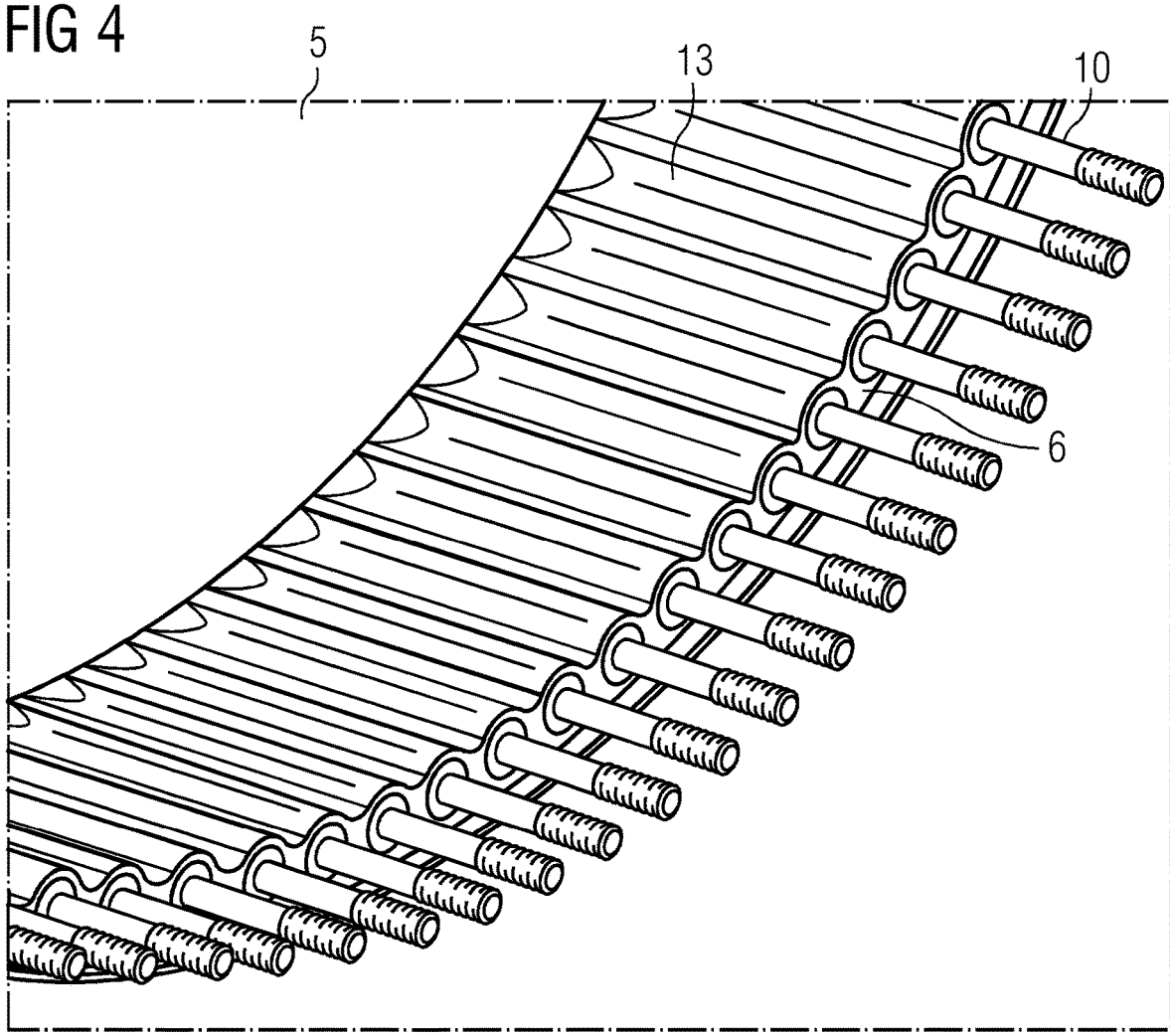
Figure 5:
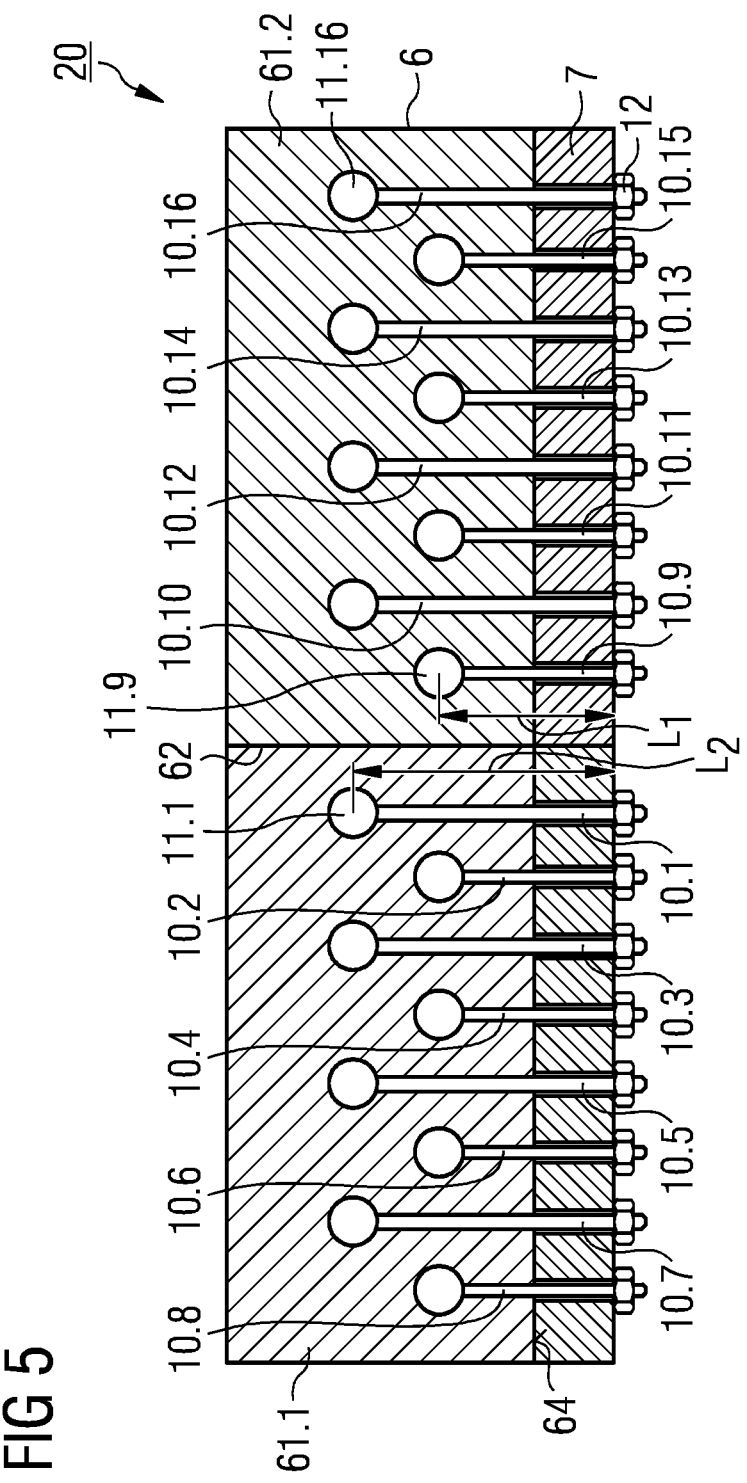
Figure 7:
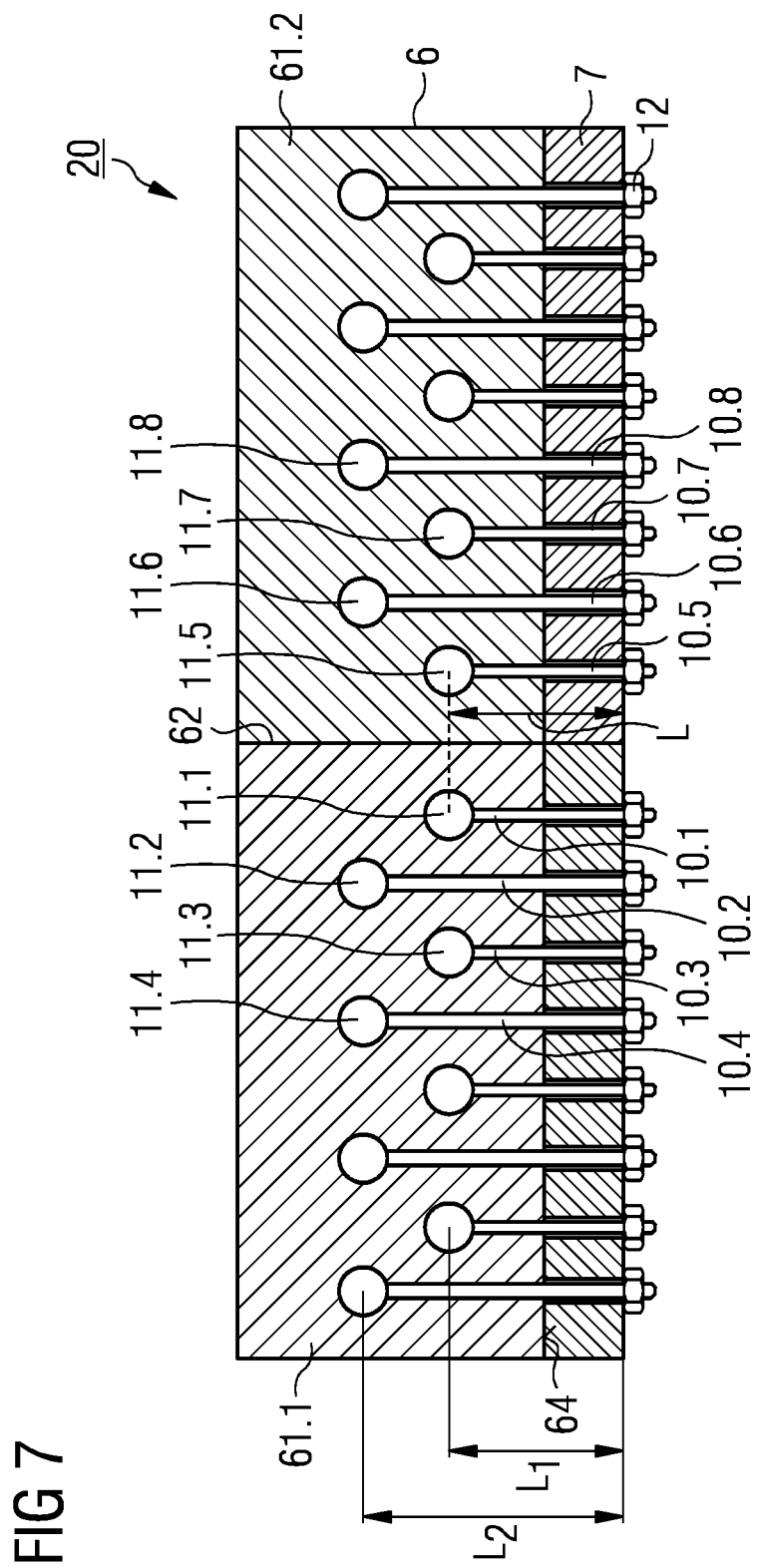
Figure 8:
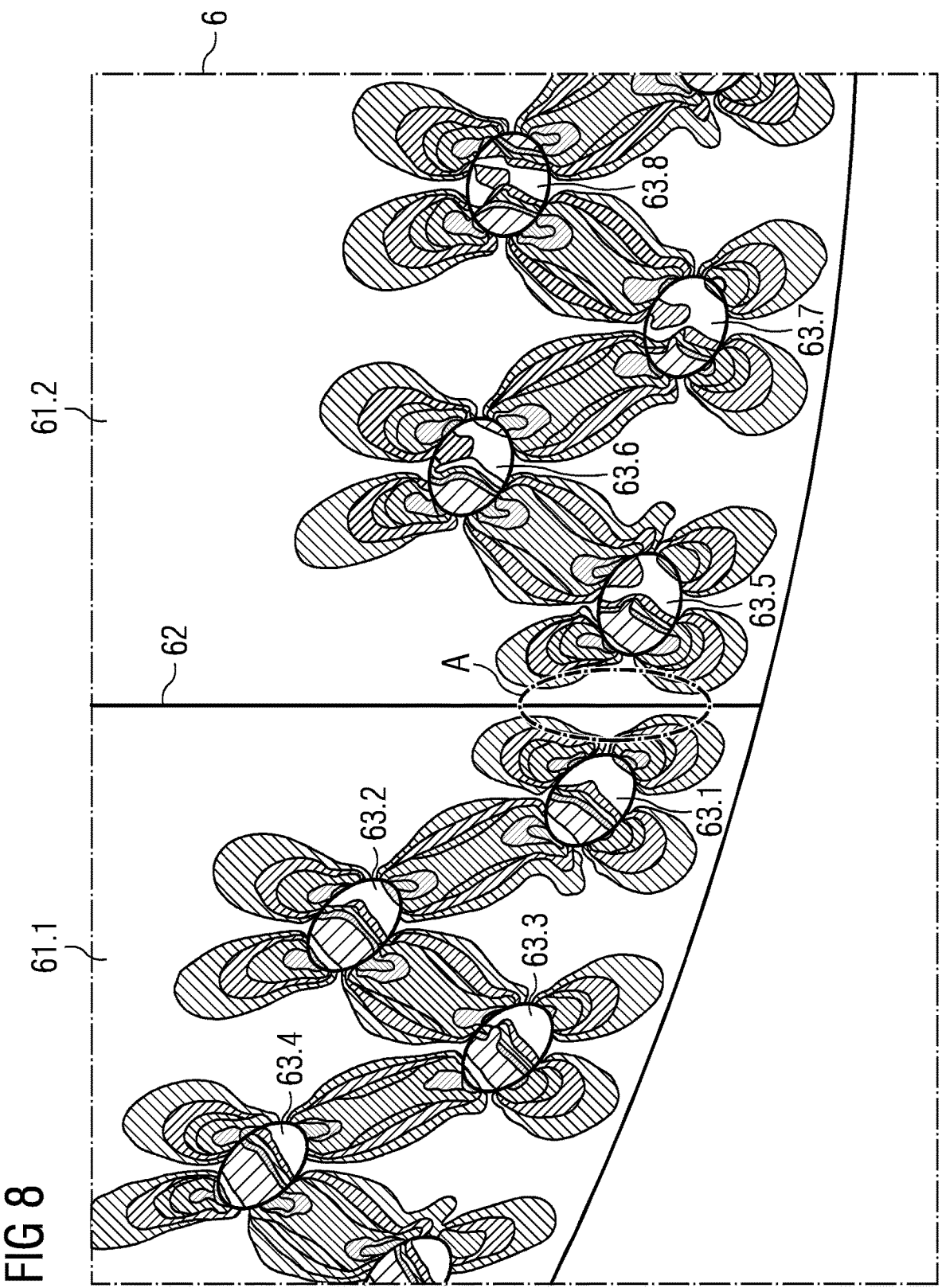
Figure 9:
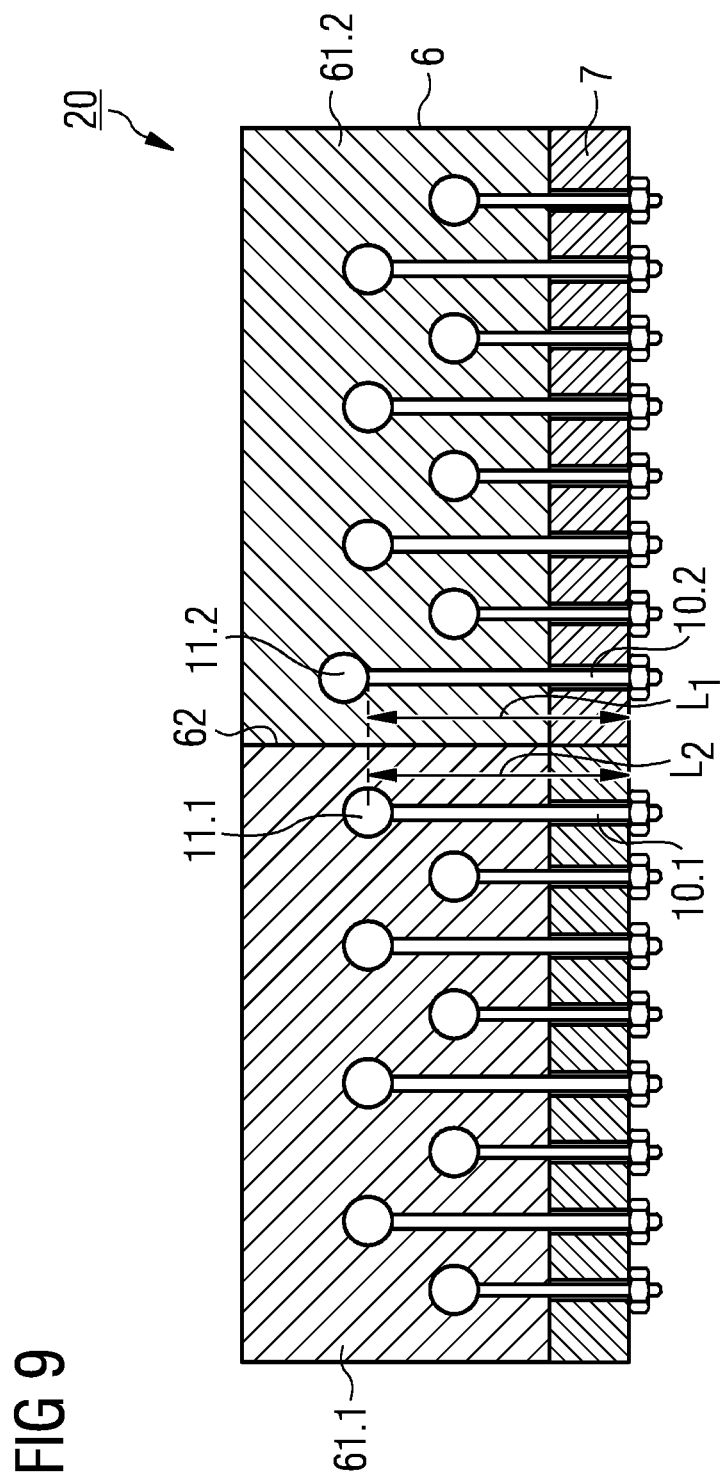
Figure 10:
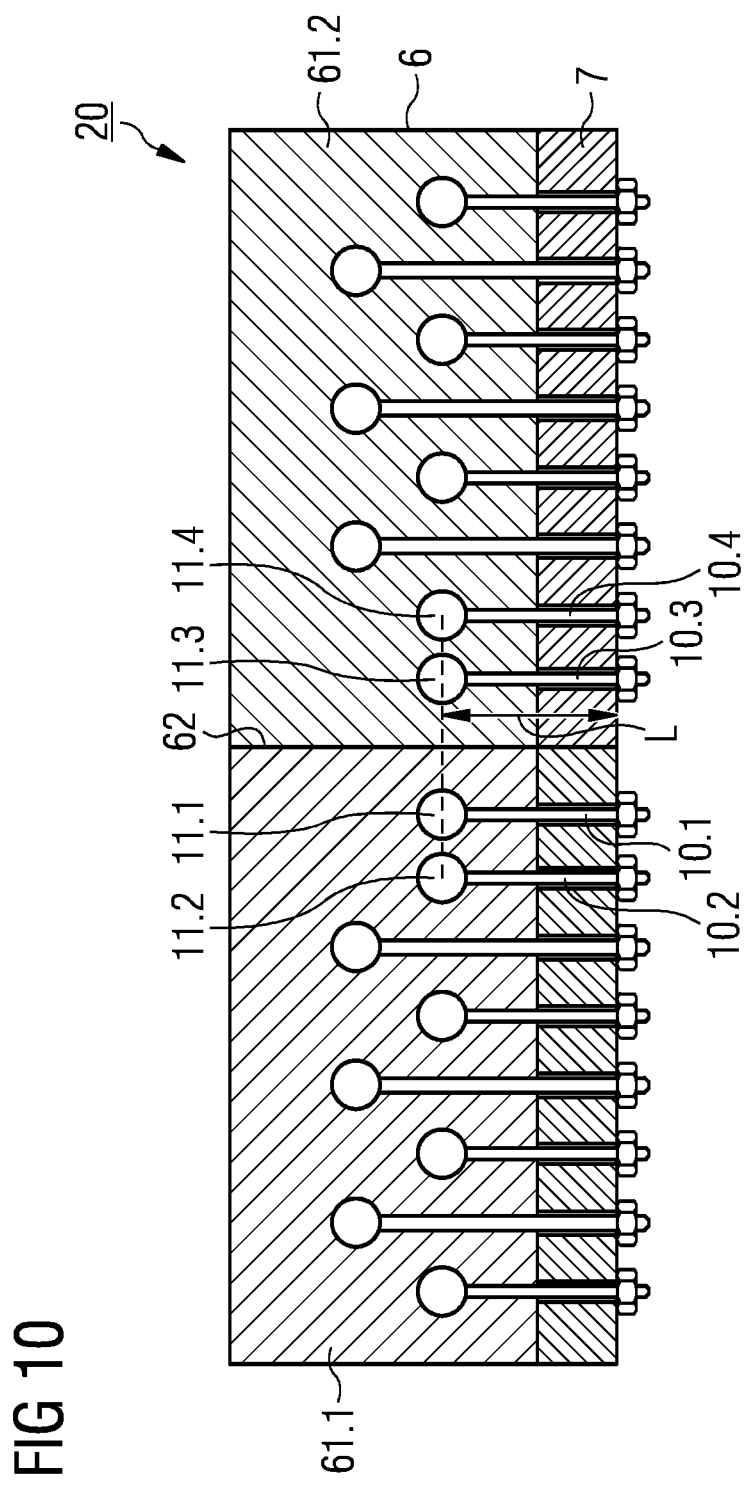
Figure 11:
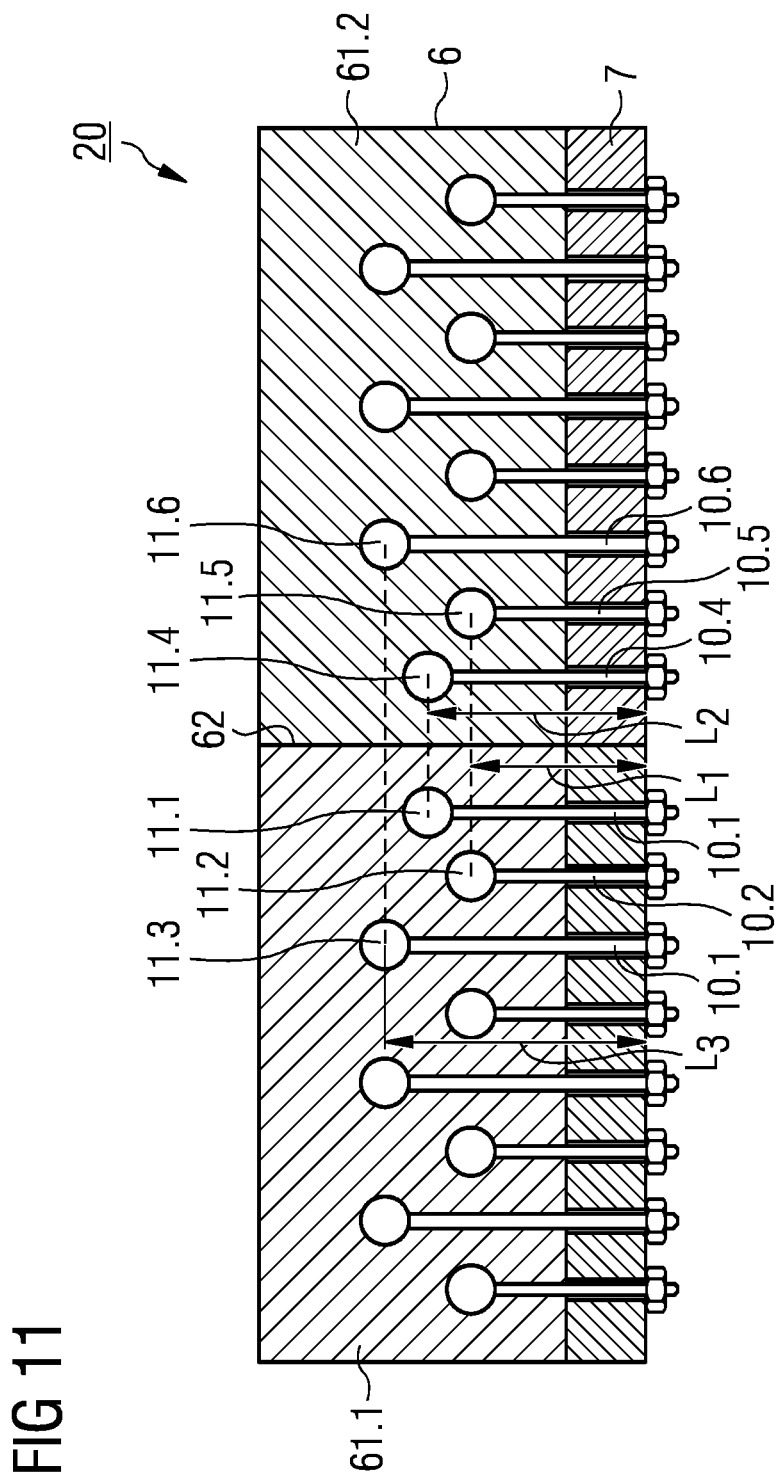
Figure 12:
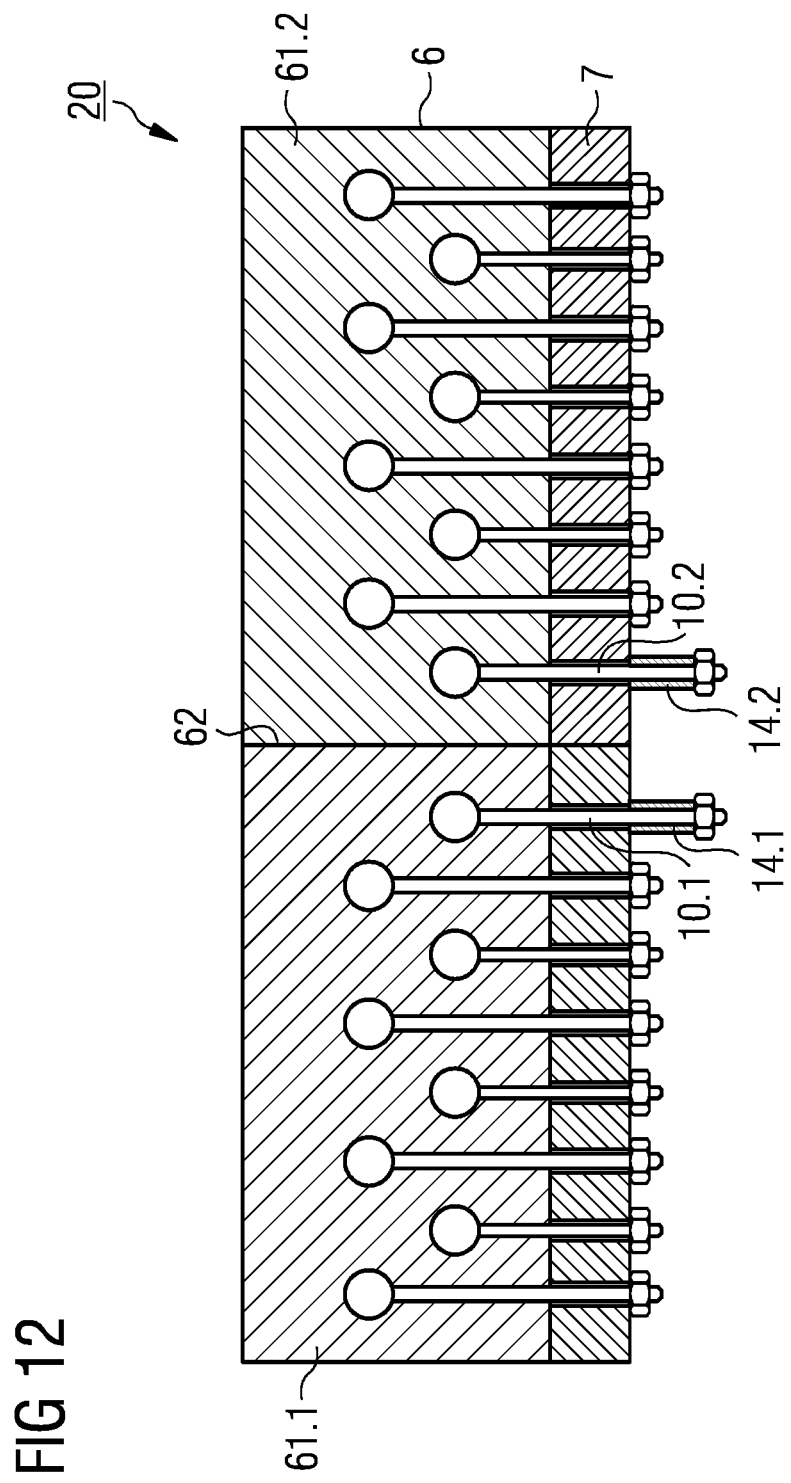
Figure 13:
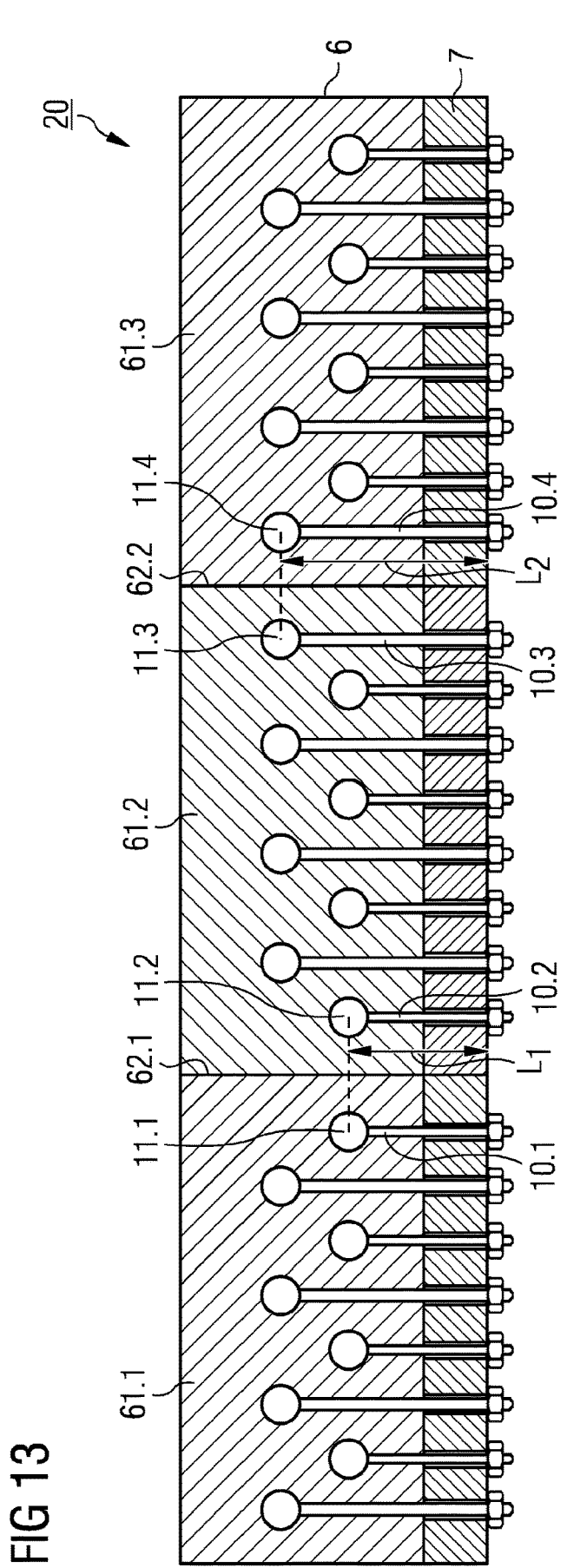

Some of the embodiments will be described in detail, with reference to the following figures, wherein like designations denote like members, wherein:

FIG. 1 shows a side perspective view on a wind turbine,

FIG. 2 shows a side perspective view on a part of a root portion of a wind turbine blade according to a first embodiment of the state of the art, FIG. 3 shows a side perspective view on a bolt with a bolted connection means and a nut, FIG. 4 shows a side perspective view on a part of a root portion of a wind turbine blade according to a second embodiment of the state of the art, FIG. 5 shows a cross section of a part of a root assembly according to an embodiment of the state of the art, FIG. 6 shows a side perspective view on a shear strain contours representation of a part of the root assembly of FIG. 5, FIG. 7 shows a cross section of a part of a root assembly according to a first embodiment of the invention, FIG. 8 shows a side perspective view on a shear strain contours representation of a part of the root assembly of FIG. 7, FIG. 9 shows a cross section of a part of a root assembly according to a second embodiment of the invention, FIG. 10 shows a cross section of a part of a root assembly according to a third embodiment of the invention, FIG. 11 shows a cross section of a part of a root assembly according to a fourth embodiment of the invention, FIG. 12 shows a cross section of a part of a root assembly according to a fifth embodiment of the invention, and FIG. 13 shows a cross section of a part of a root assembly according to a sixth embodiment of the invention.

DETAILED DESCRIPTION

Same objects in FIGS. 1 to 13 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

FIG. 1 shows a wind turbine 1 according to an embodiment of the invention. The wind turbine 1 comprises a rotor 2 having three wind turbine blades 5.1, 5.2, 5.3 connected to a hub 3. However, the number of wind turbine blades 10 may be at least one wind turbine blade 5, two wind turbine blades 5 or more than three wind turbine blades 5 and chosen as required for a certain setup of a wind turbine 1.

The hub 3 is connected to a generator (not shown) arranged inside a nacelle 4. During operation of the wind turbine 1, the wind turbine blades 5 are driven by wind to rotate and the wind's kinetic energy is converted into electrical energy by the generator in the nacelle 4.

The nacelle 4 is arranged at the upper end of a tower 8 of the wind turbine 1. The tower 8 is erected on a foundation 9 such as a monopile or tripile. The foundation 9 is connected to and/or driven into the ground or seabed.

Each of the wind turbine blades 5.1, 5.2, 5.3 has a root portion 6.1, 6.2. These root portions 6.1, 6.2 are connected to the hub 3 by bearings 7.1, 7.2 or hub flanges 7.1, 7.2. In this particular view, the root portion 6 and bearing 7 or hub flange 7 of the wind turbine blade 5.3 is covered by the hub 3.

FIG. 2 shows a side perspective view on a part of a root portion 6 of a wind turbine blade 5 according to a first embodiment of the state of the art. Multiple bolted connection means 11 are arranged within the root portion 6 along the circumference of it. Bolts 10 are attached to the bolted connection means 11. The bolts 10 may be attached to a hub flange 7 or bearing 7 as shown in FIG. 1.

FIG. 3 shows a side perspective view on a bolt 10 with a bolted connection means 11 and a nut 12. The bolted connection means 11 is a bushing in this case and has a cylindrical shape. It may be placed in corresponding cavities within the bolted connection means 11, as can be seen in FIG. 2. When the bolt 10 is secured by the bushing 11 within the root portion 6 and the hub flange 7 or bearing 7 is attached thereto, they may be secured by the nut 12.

FIG. 4 shows a side perspective view on a part of a root portion 6 of a wind turbine blade 5 according to a second embodiment of the state of the art. Here, instead of bushings 11 as bolted connection means, threaded inserts 13 are used for connecting the bolts 10 thereto.

FIG. 5 shows a cross section of a part of a root assembly 20 according to an embodiment of the state of the art. Two root segments 61.1, 61.2 of the root assembly 20 are connected with each other at a root segment interface 62. The root segments 61.1, 61.2 may be glued or casted together, for example. Each of the first root segment 61.1 and the second root segment 61.2 comprise multiple staggered bolted connection means 11, such that the bolted connection means 11 are alternately located at a first distance $L_1$ and a second distance $L_2$ from a root attachment surface 64. The distances $L_1$, $L_2$ are measured from the centers of the bolted connection means 11 to the root attachment face 64, in this case. Thereby, the multiple bolts 10.1 ... 10.16 are staggered, such that the bolts 10.1 ... 10.16 alternately have a first length $L_1$ and a second length $L_2$. Each of the bolts 10.1 ... 10.16 is secured within one of the root segments 61.1, 61.2 by a nut 12, thereby securing the bearing 7 or hub flange 7 to the root segments 61.1, 61.2.

In an interface pair of the bolted connection means 11.1, 11.9 provided within different root segments 61.1, 61.2 and arranged closest to the root segment interface 62, the bolted connection means 11.1 of the interface pair is provided at the distance $L_2$ and the bolted connection means 11.9 of the interface pair is provided at the distance $L_1$ from the root attachment face 64. The distance $L_1$ is less than the distance $L_2$.

FIG. 6 shows a side perspective view on a shear strain contours representation of a part of the root assembly 20 of FIG. 5. This representation shows the shear strain acting upon the part of the root assembly 20 when forces act on the wind turbine blade 5 during operation of the wind turbine 1.

In this view, the bolted connection means 11 are not shown. Instead of the bolted connection means 11, the cavities 63.1, 63.2, 63.9, 63.10 for the bolted connection means 11 can be seen. The bolted connection means 11 are positioned within the cavities 13 and transfer the forces from the bolts 10 via the bolted connection means 11 to the root segments 61.1, 61.2. It can be seen that shear strain is applied at the root segment interface 62. This is problematic due to the root not being manufactured integral but from root segments 61.1, 61.2 joined at the root segment interface 62. Thus, the root assembly 20 is particularly susceptible to failure at the root segment interface 62.

FIG. 7 shows a cross section of a part of a root assembly 20 according to a first embodiment of the invention. Contrary to the root assembly 20 according to the embodiment of the state of the art as depicted in FIGS. 5 and 6, the interface pair of bolted connection means 11.1, 11.5, in which the bolted connection means 11.1, 11.5 are provided within different root segments 61.1, 61.3 and arranged closest to the root segment interface 62, the two bolted connection means 11.1, 11.5 of the interface pair are provided at the same distance L from the root attachment face 64. Further, the bolts 10.1, 10.5 at the root segment interface 62 are provided with equal length L.

FIG. 8 shows a side perspective view on a shear strain contours representation of a part of the root assembly 20 of FIG. 7. It can be taken from FIG. 8, that the shear strain occurring at the root segment interface 62 in the root assembly of FIG. 5 has been eliminated by providing the bolted connection means 11.1, 11.5 at same distance L from the root attachment face 64 within the cavities 63.1, 63.5.

FIG. 9 shows a cross section of a part of a root assembly 20 according to a second embodiment of the invention. In this second embodiment, the bolted connection means 11 of the interface pair at the root segment interface 62 are provided at same distance $L_1$, $L_2$ from the root attachment face 64. However, the distance is measured from any point of the bolted connection means 11. As such, the distance is measured at a bottom of the bolted connection means 11.2 and at a center of the bolted connection means 11.1.

FIG. 10 shows a cross section of a part of a root assembly 20 according to a third embodiment of the invention. According to the third embodiment, the at least one interface pair comprises two bolted connection means 11.1, 11.2, 11.3, 11.4 within each of the different root segments 61.1, 61.2, the two bolted connection means 11.1, 11.2, 11.3, 11.4 being arranged closest to the root segment interface 62 between the different root segments 61.1, 61.2, wherein the four bolted connection means 11.1, 11.2, 11.3, 11.4 of the at least one interface pair are provided at the same distance L from the root attachment face 64.

FIG. 11 shows a cross section of a part of a root assembly 20 according to a fourth embodiment of the invention. According to this fourth embodiment, the bolted connection means 11.1, 11.2 of the interface pair at the root segment interface 62 are at a third distance $L_3$ from the root attachment face 64, the third distance $L_3$ being in between the first distance $L_1$ and the second distance $L_2$.

FIG. 12 shows a cross section of a part of a root assembly 20 according to a fifth embodiment of the invention. According to this fifth embodiment, both bolts 10.1, 10.2 at the root segment interface 62 have extenders 14.1, 14.2. Thereby, the bolts 10 having the larger length of the two lengths of bolts 10 may be used at the root segment interface 62.

FIG. 13 shows a cross section of a part of a root assembly 20 according to a fifth embodiment of the invention. At a first root segment interface 62.1, the bolted connection means 11.1, 11.2 of the interface pair are provided at the first distance $L_1$ from the root attachment face 64 and at a second root segment interface 62.2, the bolted connection means 11.3, 11.4 of the interface pair are provided at the second distance $L_2$ from the root attachment face 64. Thus, it is not necessary to provide the bolted connection means 11 of every interface pair at the same distance L from the root attachment face 64. Further, it is not necessary to provide all the bolts 10 at the root segment interfaces 62 with the same length L but merely that the pairs of bolts 10 at the root segment interfaces 62 are of equal length.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A root assembly of a wind turbine blade for a wind turbine, comprising:
    a root portion comprising at least two root segments being joined together at root segment interfaces formed between the at least two root segments;
    a root attachment face of the root portion attached to a bearing or a hub flange of the root assembly by multiple bolts, wherein each of the multiple bolts is connected to one of a multiple of bolted connection means fixedly arranged within the root segments such that the multiple bolts are arranged adjacent to each other along a circumference of the root portion and the bolted connection means are arranged adjacent to each other along the circumference of the root portion; and
    adjacent bolted connection means are offset from one another in a way such that the adjacent bolted connection means are provided at different distances from the root attachment face,
    wherein in at least one of an interface pair of bolted connection means, the bolted connection means of the at least one interface pair are provided within different root segments of the at least two root segments and are arranged closest to the root segment interface between the different root segments, the two bolted connection means of the at least one interface pair are provided at the same distance from the root attachment face.

2. The root assembly according to claim 1, wherein the bolted connection means are bushings and/or threaded inserts.

3. The root assembly according to claim 1, wherein the multiple bolts are secured against the bearing or the hub flange by nuts.

4. The root assembly according to claim 1, wherein centers of the bolted connection means of the at least one interface pair are provided at the same distance from the root attachment face.

5. The root assembly according to claim 1, wherein a distance between the bolts connected to the bolted connection means of the interface pair is greater than a distance between adjacent bolts connected to bolted connection means within the at least two root segments.

6. The root assembly according to claim 1, wherein a circumferential distance between the bolted connection means of the interface pair is greater than a circumferential distance between bolted connection means within the at least two root segments.

7. The root assembly according to claim 1, wherein the at least one interface pair comprises two bolted connection means within each of the different root segments, the two bolted connection means being arranged closest to the root segment interface between the different root segments, wherein the four bolted connection means of the at least one interface pair are provided at the same distance from the root attachment face.

8. The root assembly according to claim 1, wherein adjacent bolts are offset from one another within the respective root segments in that they are provided with different lengths within the root segments, whereby in at least one of an interface pair of bolts, wherein the bolts of the at least one interface pair are provided within different root segments of the at least two root segments and are arranged closest to the root segment interface between the different root segments, the two bolts of the at last one interface pair are provided with the same length.

9. The root assembly according to claim 1, wherein the multiple bolts have a first length or a second length, wherein the second length is greater than the first length, and wherein the bolts of the multiple bolts having the first length and the bolts of the multiple bolts having the second length are alternately connected to the adjacent offset bolted connection means.

10. The root assembly according to claim 9, wherein the bolted connection means of the at least one interface pair are connected either with the bolts having the first length or with the bolts having the second length.

11. The root assembly according to claim 9, wherein the bolted connection means of the at least one interface pair are connected with bolts having a third length, wherein the third length is different from the first length and the second length.

12. The root assembly according to claim 11, wherein the third length is in between the first length and the second length.

13. The root assembly according to claim 1, wherein at least one of the bolts is provided with an extender.

14. A wind turbine blade comprising the root assembly according to claim 1.

15. The wind turbine comprising at least one wind turbine blade according to claim 14.

* * * * *